US009250358B2

(12) United States Patent
Cho et al.

(10) Patent No.: US 9,250,358 B2
(45) Date of Patent: Feb. 2, 2016

(54) ADHESIVE FOR POLARIZING PLATE, AND POLARIZING PLATE COMPRISING THE SAME

(71) Applicant: LG Chem, Ltd., Seoul (KR)

(72) Inventors: Sae-Han Cho, Daejeon (KR); Eun-Mi Seo, Daejeon (KR); Boong-Goon Jeong, Daejeon (KR); Kyun-Il Rah, Daejeon (KR); Nam-Jeong Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/312,391

(22) Filed: Jun. 23, 2014

(65) Prior Publication Data

US 2014/0302328 A1    Oct. 9, 2014

Related U.S. Application Data

(63) Continuation of application No. 13/823,510, filed as application No. PCT/KR2011/006953 on Sep. 20, 2011.

(30) Foreign Application Priority Data

Sep. 20, 2010  (KR) .................. 10-2010-0092684
Apr. 18, 2011  (KR) .................. 10-2011-0035825

(51) Int. Cl.
*G02B 1/08*    (2006.01)
*C09J 4/00*    (2006.01)
(Continued)

(52) U.S. Cl.
CPC *G02B 1/08* (2013.01); *C08G 59/68* (2013.01); *C09J 4/00* (2013.01); *C09J 7/0264* (2013.01);
(Continued)

(58) Field of Classification Search
CPC .......... G02B 1/08; G02B 5/3033; C09J 4/00; C09J 7/0264; C09J 133/14; C09J 2203/318; C09J 2433/00; C09J 2463/00; Y10T 428/31797; Y10T 428/31507; Y10T 428/3188; Y10T 428/31786; Y10T 428/31909; Y10T 428/31515; Y10T 428/31938
USPC ................ 428/414, 412, 523, 480, 507, 483; 522/166; 524/500
See application file for complete search history.

(56) References Cited

U.S. PATENT DOCUMENTS 5,252,694 A  *  10/1993  Willett et al. .................. 522/13
6,767,935 B1     7/2004  Luchterhandt et al.
(Continued)

FOREIGN PATENT DOCUMENTS

EP    0 386 909 A2    9/1990
EP    0393407 A1      10/1990
(Continued)

*Primary Examiner* — Michael M Bernshteyn
(74) *Attorney, Agent, or Firm* — Dentons US LLP

(57) ABSTRACT

Provided are an adhesive for a polarizing plate and a polarizing plate comprising the same, and more particularly, an adhesive composition for a polarizing plate comprising one or more acrylic monomers having a hydrophilic group, a radical polymerization initiator, an epoxy resin, and a cationic photopolymerization initiator, as well as a polarizing plate comprising a polarizer, a polymer film adhered to one side or both sides of the polarizer, and an adhesive layer for bonding the polarizer and the polymer film, in which the adhesive layer is formed of an adhesive composition comprising one or more acrylic monomers having a hydrophilic group, a radical polymerization initiator, an epoxy resin, and a cationic photopolymerization initiator.

14 Claims, 1 Drawing Sheet

(51) Int. Cl.
*C09J 7/02* (2006.01)
*C09J 133/14* (2006.01)
*C08G 59/68* (2006.01)
*C09J 163/00* (2006.01)
*G02B 5/30* (2006.01)

(52) U.S. Cl.
CPC .............. *C09J 133/14* (2013.01); *C09J 163/00* (2013.01); *C09J 2203/318* (2013.01); *C09J 2433/00* (2013.01); *C09J 2463/00* (2013.01); *G02B 5/3033* (2013.01); *Y10T 428/3188* (2015.04); *Y10T 428/31507* (2015.04); *Y10T 428/31515* (2015.04); *Y10T 428/31786* (2015.04); *Y10T 428/31797* (2015.04); *Y10T 428/31909* (2015.04); *Y10T 428/31938* (2015.04)

(56) References Cited

U.S. PATENT DOCUMENTS

| | | | |
|---|---|---|---|
| 6,949,297 B2 * | 9/2005 | Yang et al. | 428/520 |
| 2006/0202171 A1 * | 9/2006 | Yoshida et al. | 252/500 |
| 2007/0092733 A1 | 4/2007 | Yang et al. | |
| 2008/0108721 A1 * | 5/2008 | Ha et al. | 522/33 |
| 2009/0185271 A1 | 7/2009 | Yaegashi et al. | |
| 2010/0079867 A1 * | 4/2010 | Wakizaka et al. | 359/586 |
| 2010/0327493 A1 | 12/2010 | Fong et al. | |

FOREIGN PATENT DOCUMENTS

| | | |
|---|---|---|
| JP | 4-261489 A | 9/1992 |
| JP | 05310885 | 11/1993 |
| JP | 10-025453 A | 1/1998 |
| JP | 2006-076058 A | 3/2006 |
| JP | 2008-260879 A | 10/2008 |
| KR | 1020020030852 | 4/2002 |
| KR | 1020040053242 | 6/2004 |
| KR | 100773634 | 11/2007 |
| KR | 101010574 | 1/2011 |
| WO | 2008-111584 A1 | 9/2008 |
| WO | WO 2008111584 A1 * | 9/2008 |
| WO | 2011/013663 A1 | 2/2011 |

* cited by examiner

ADHESIVE FOR POLARIZING PLATE, AND
POLARIZING PLATE COMPRISING THE
SAME

This application is continuation application of U.S. application Ser. No. 13/823,510, filed Mar. 14, 2013, which is a National Stage Application under 35 U.S.C. §371 of international application No. PCT/KR2011/006953 filed on Sep. 20, 2011, which claims the benefit of Korean Application Nos. 10-2010-0092684, filed Sep. 20, 2010 and 10-2011-0035825, filed Apr. 18, 2011 in the Korean Intellectual Property Office, the disclosure of which are incorporated herein by reference.

BACKGROUND OF THE INVENTION

1. Field of the Invention

The present invention relates to a non-aqueous adhesive composition for a polarizing plate to bond a polarizer and a protective film or a compensation film, and a polarizing plate prepared through bonding by using the non-aqueous adhesive composition.

2. Description of the Related Art

A liquid crystal display device has been used in various display devices due to having characteristics such as low power consumption, low-voltage operation, lightweightness, and thinness. The liquid crystal display device may be composed of many materials such as a liquid cell, a polarizing plate, a retardation film, a light collection sheet, a diffusion film, a light guide plate, and a light reflecting sheet. Therefore, improvements targeting enhancements of productivity, lightening, and brightness have been actively undertaken by reducing the number of constituent films, or decreasing the thicknesses thereof.

In general, a polarizing plate has been used in a structure, in which a protective film is stacked on one or both sides of a polarizer formed of a polyvinyl alcohol (hereinafter, referred to as "PVA")-based resin dyed with a dichroic dye or iodine by using a water-based adhesive prepared by dissolving a PVA-based material in water. However, this may be inconvenient, in that a corona treatment or a primer treatment may be performed due to low adhesive strength between the film and the water-based adhesive.

The protective film may be formed of triacetyl cellulose (TAC), polyethylene terephthalate (PET), a cycloolefin polymer (COP), an acrylic film, or a combination thereof.

An acrylic adhesive, an adhesive for a dry laminate in which a polyurethane-based resin solution and a polyisocyanate resin solution are mixed, a styrene butadiene rubber-based adhesive, an epoxy-based adhesive, a PVA-based adhesive, a polyurethane-based adhesive, an adhesive containing a polyester-based ionomer type urethane resin and a compound having a glycidyloxy group, or a thermocurable-type adhesive are known as adhesives which may be used for bonding the polarizer and the protective film. In particular, a water-based adhesive formed of an aqueous solution having a PVA-based resin is used in most cases.

However, when the protective film is an acrylic film, adhesive strength, with respect to the water-based adhesive may be low, due to the characteristics thereof. As a result, there may be limitations in reprocessability or cuttability. For this reason, there may be inconvenience, in that the protective film may need to be coated with a primer and then bonded with the water-based adhesive, or wetting, with respect to water, is increased by applying corona discharge.

Meanwhile, in addition to the degradation of adhesive strength according to a substrate, when different substrates are used as protective films on one side and the other side of a PVA device, there may be problems like the occurrence of curling in a polarizing plate caused by a drying process of the water-based adhesive and a degradation of initial optical physical properties, and therefore, a non-aqueous based adhesive was developed in order to resolve the foregoing problems.

In general, with respect to the non-aqueous based adhesive, the thickness of a final adhesive layer tends to be thicker in comparison to the case of the water-based adhesive. Therefore, the thickness of the adhesive layer may be decreased by minimizing the viscosity thereof. At this time, water resistivity becomes poor when the content of an oligomer is reduced and a hydrophilic monomer is used in order to maintain the non-aqueous based adhesive in a state of low viscosity, and a decrease in adhesive strength generally occurs when a polyfunctional monomer or a hydrophobic monomer is added in order to improve water resistance. As another method of increasing water resistance, an isocyanate-based compound having good water resistivity may be added, but there may be a limitation in solution stability caused by the hydrophilic monomer having a reaction therewith.

Therefore, as an adhesive composition which may be used in various substrates, e.g., a TAC film, an acrylic film, a COP film, or a PET film, the development of a non-aqueous adhesive for a polarizing plate having excellent adhesive strength as well as improved water resistivity and degree of curing, and particularly excellent thermal shock properties at low viscosity, and a polarizing plate bonded by using the non-aqueous adhesive are required.

SUMMARY OF THE INVENTION

An aspect of the present invention provides a low viscosity adhesive for a polarizing plate having excellent adhesive strength, water resistance, and thermal shock properties while maintaining the state of low viscosity of the adhesive.

Another aspect of the present invention provides a polarizing plate comprising the foregoing adhesive.

Another aspect of the present invention provides an optical device comprising the foregoing polarizing plate.

According to an aspect of the present invention, there is provided an adhesive composition for a polarizing plate comprising: one or more acrylic monomers having a hydrophilic group; a radical polymerization initiator; an epoxy resin; and a cationic photopolymerization initiator.

According to another aspect of the present invention, there is provided a polarizing plate comprising: a polarizer; a polymer film adhered to one side or both sides of the polarizer; and an adhesive layer for bonding the polarizer and the polymer film, wherein the adhesive layer is formed of an adhesive composition comprising one or more acrylic monomers having a hydrophilic group, a radical polymerization initiator, an epoxy resin, and a cationic photopolymerization initiator.

According to another aspect of the present invention, there is provided an optical device comprising a polarizing plate.

The adhesive composition for a polarizing plate may comprise 20 to 80 parts by weight of the one or more acrylic monomers having a hydrophilic group, 0.5 to 10 parts by weight of the radical polymerization initiator, 30 to 80 parts by weight of the epoxy resin and 1 to 10 parts by weight of the cationic photopolymerization initiator.

The adhesive composition for a polarizing plate, for example, may comprise 20 to 50 parts by weight of the one or more acrylic monomers having a hydrophilic group, 0.5 to 5 parts by weight of the radical polymerization initiator, 20 to 60 parts by weight of the epoxy resin and 1 to 7 parts by weight of the cationic photopolymerization initiator.

The hydrophilic group may be a hydroxy group (—OH).

The epoxy resin may be comprised of a combination of a first epoxy resin compound including one or more epoxidized aliphatic cyclic groups and a second epoxy compound including one or more glycidyl ether groups.

The first epoxy compound may be at least one selected from the group consisting of 3,4-epoxycyclohexylmethyl-3,4-epoxycyclohexane carboxylate, bis(3,4-epoxycyclohexylmethyl)adipate dicyclopentadiene dioxide, limonene dioxide, and 4-vinylcyclohexene dioxide.

The second epoxy compound may be selected from the group consisting of 1,4-cyclohexanedimethanol diglycidyl ether, a novolac-based epoxy, a bisphenol A-based epoxy, a bisphenol F-based epoxy, a brominated bisphenol-based epoxy, 1,6-hexanediol diglycidyl ether, trimethylolpropane triglycidyl ether, n-butyl glycidyl ether, aliphatic glycidyl ether (C12-C14), 2-ethylhexyl glycidyl ether, phenyl glycidyl ether, o-cresyl glycidyl ether, and nonyl phenyl glycidyl ether.

The adhesive composition for a polarizing plate may comprise 15 to 40 parts by weight of the first epoxy compound and 15 to 40 parts by weight of the second epoxy compound based on 100 parts by weight of the adhesive composition for a polarizing plate.

The first and second epoxy compounds may be comprised in a weight ratio range of 1:3 to 3:1.

The acrylic monomer having a hydrophilic group may be selected from the group consisting of hydroxyethyl acrylate (HEA), hydroxyethyl methacrylate, hydroxypropyl acrylate, hydroxypropyl methacrylate, hydroxybutyl acrylate, or a mixture thereof.

The adhesive composition for a polarizing plate may further comprise greater than 0 and equal to or less than 50 parts by weight of a monofunctional hydrophobic monomer based on 100 parts by weight of a total adhesive composition.

The monofunctional hydrophobic monomer may comprise at least one monomer selected from the group consisting of isobornyl acrylate (IBOA), benzyl(meth)acrylate, nonyl (meth)acrylate, isobutyl(meth)acrylate, isodecyl acrylate, lauryl acrylate, stearyl acrylate, 2-ethyl hexyl acrylate, polyethylene glycol methacrylate, octyl/decyl acrylate, phenoxyethyl acrylate (PEA), nonylphenol ethoxylate acrylate, dicyclopentenyl acrylate, dicyclopentenyl oxyethyl acrylate, propylene glycol mono(meth)acrylate, and ethoxyethoxy ethyl acrylate.

The monofunctional hydrophobic monomer may be phenoxyethyl acrylate and isobornyl acrylate.

The adhesive composition for a polarizing plate may comprise 20 to 80 parts by weight of hydroxyethyl acrylate, greater than 0 and equal to or less than 30 parts by weight of phenoxyethyl acrylate, greater than 0 and equal to or less than 20 parts by weight of isobornyl acrylate, 30 to 80 parts by weight of an epoxy resin, 1 to 7 parts by weight of a cationic photopolymerization initiator, and 0.5 to 5 parts by weight of a radical polymerization initiator based on 100 parts by weight of the adhesive composition for a polarizing plate.

The adhesive composition for a polarizing plate may have a viscosity range of 10 cP to 30 cP at 25° C.

The adhesive composition for a polarizing plate may further comprise greater than 0 and equal to or less than 4 parts by weight of urethane acrylate.

According to the present invention, an adhesive composition for a polarizing plate having excellent optical physical properties such as adhesive strength and water resistance, and particularly improved thermal shock physical properties while maintaining low viscosity, and a polarizing plate bonded by using the adhesive composition may be prepared.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENTS

Figure 1:
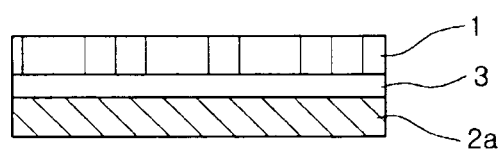
FIG. 1 illustrates a polarizer 1 and a protective film or a viewing angle compensation film 2a which are bonded by an adhesive layer 3 formed by an adhesive composition of the present invention.

Hereinafter, the present invention is described in more detail.

The present invention relates to an adhesive composition for a polarizing plate comprising one or more acrylic monomers having a hydrophilic group, a radical polymerization initiator, an epoxy resin, and a cationic photopolymerization initiator, and more particularly, the adhesive composition for a polarizing plate may comprise 20 to 80 parts by weight of the one or more acrylic monomers having a hydrophilic group, 0.5 to 10 parts by weight of the radical polymerization initiator, 30 to 80 parts by weight of the epoxy resin, and 1 to 10 parts by weight of the cationic photopolymerization initiator. In this case, adhesive strength between the film and the polarizer and water resistivity are excellent while the state of viscosity is low. In the present invention, the term "parts by weight" denotes a weight ratio of each component.

The adhesive composition for a polarizing plate may comprise 20 to 50 parts by weight of the one or more acrylic monomers having a hydrophilic group, 0.5 to 5 parts by weight of the radical polymerization initiator, 20 to 60 parts by weight of the epoxy resin, and 1 to 7 parts by weight of the cationic photopolymerization initiator, and for example, may comprise 30 parts by weight of the one or more acrylic monomers having a hydrophilic group, 3 parts by weight of the radical polymerization initiator, 40 parts by weight of the epoxy resin, and 3 parts by weight of the cationic photopolymerization initiator.

When the acrylic monomer having a hydrophilic group is less than 20 parts by weight, adhesive strength may decrease, and when the acrylic monomer having a hydrophilic group is more than 80 parts by weight, water resistivity and adhesive strength of the polarizing plate may decrease. When the epoxy resin is less than 30 parts by weight, the improvement effects of water resistivity and endurance reliability may decrease, and when the epoxy resin is more than 80 parts by weight, compatibility and viscosity may increase. When the radical polymerization initiator is less than 0.5 parts by weight, a curing rate may decrease due to an increase in a content of a cationic polymerization component, and when the radical polymerization initiator is more than 10 parts by weight, compatibility and optical durability may be poor. When the cationic photopolymerization initiator is less than 1 part by weight, an improvement effect of a water resistivity may decrease, and when the cationic photopolymerization initiator is more than 10 parts by weight, unit price may increase while an improvement in effectiveness may be insignificant.

The adhesive composition of the present invention comprises one or more monomers selected from the group consisting of acrylic monomers containing a hydrophilic group as a major component and is a photocurable-type adhesive for a polarizing plate, in which an epoxy resin and a cationic polymerization initiator are added in order to increase water resistivity reduced due to the hydrophilicity of the foregoing monomer.

In particular, the epoxy resin, which may be used in the present invention, may be comprised of a combination of a first epoxy resin compound including one or more epoxidized aliphatic cyclic groups and a second epoxy compound including one or more glycidyl ether groups.

When the combination of the foregoing first and second epoxies is used, an adhesive for a polarizing plate having improved thermal shock physical properties may be prepared. The adhesive for a polarizing plate may comprise 15 to 40 parts by weight of the first epoxy compound and 15 to 40 parts by weight of the second epoxy compound, based on 100 parts by weight of the adhesive composition for a polarizing plate, and for example, may comprise 20 parts by weight of the first epoxy and the second epoxy, respectively. When the epoxy resin comprised of the combination of the first and second epoxy compounds is used, better adhesion with respect to triacetyl cellulose (TAC) may be provided.

Meanwhile, the first and second epoxy compounds, for example, may be comprised in a weight ratio range of 1:3 to 3:1. When the first epoxy compound is comprised in an amount less than that of the foregoing range, an improvement effect of a thermal shock may decrease, and when the first epoxy compound is comprised in more than the foregoing range, there may be cases in which adhesive strength with respect to the substrate may be limited.

The first epoxy compound is not particularly limited, so long as it increases glass transition temperature (Tg) and provides hardness to the adhesive layer. The epoxidized aliphatic cyclic group of the first epoxy compound may be an epoxidized cyclohexyl group, for example, a 3,4-epoxycyclohexylmethyl group, and may be at least one selected from the group consisting of 3,4-epoxycyclohexylmethyl-3,4-epoxycyclohexane carboxylate, bis(3,4-epoxycyclohexylmethyl) adipate dicyclopentadiene dioxide, limonene dioxide, and 4-vinylcyclohexene dioxide.

The second epoxy compound is not particularly limited so long as it includes one or more glycidyl ether groups, and more particularly, may be selected from the group consisting of 1,4-cyclohexanedimethanol diglycidyl ether, a novolac-based epoxy, a bisphenol A-based epoxy, a bisphenol F-based epoxy, a brominated bisphenol-based epoxy, 1,6-hexanediol diglycidyl ether, trimethylolpropane triglycidyl ether, n-butyl glycidyl ether, aliphatic glycidyl ether (C12-C14), 2-ethylhexyl glycidyl ether, phenyl glycidyl ether, o-cresyl glycidyl ether, and nonyl phenyl glycidyl ether. The second epoxy compound may improve the adhesive strength of the adhesive layer and in particular, may improve adhesive strength by providing softness.

The hydrophilic group of the acrylic monomer may be a hydroxy group (—OH) or a carboxy group (—COOH), and for example, may be a hydroxy group (—OH). Particular examples of the monomer having a hydrophilic group may be selected from the group consisting of hydroxyethyl acrylate (HEA), hydroxyethyl methacrylate, hydroxypropyl acrylate, hydroxypropyl methacrylate, hydroxybutyl acrylate, and mixtures thereof. However, the monomer having a hydrophilic group is not limited thereto and may include a monomer containing a hydrophilic group well known in the art.

The cationic photopolymerization initiator is a compound producing cationic species or a Lewis acid by the irradiation of active energy rays, and for example, may be an onium salt such as an aromatic diazonium salt, an aromatic iodine aluminum salt, or an aromatic sulfonium salt, and an iron-arene complex. However, the cationic photopolymerization initiator is not limited thereto and may use a photosensitizer according to the efficiency of the initiator.

Further, a monofunctional hydrophobic monomer may be added in order to increase the compatibility of the adhesive with respect to the initiator of the composition for a polarizing plate of the present invention and the adhesiveness with respect to the substrate, and for example, the monofunctional hydrophobic monomer may be isobornyl acrylate (IBOA), benzyl(meth)acrylate, nonyl(meth)acrylate, isobutyl(meth)acrylate, isodecyl acrylate, lauryl acrylate, stearyl acrylate, 2-ethyl hexyl acrylate, polyethylene glycol methacrylate, octyl/decyl acrylate, phenoxyethyl acrylate (PEA), nonylphenol ethoxylate acrylate, dicyclopentenyl acrylate, dicyclopentenyl oxyethyl acrylate, propylene glycol mono(meth)acrylate, and ethoxyethoxy ethyl acrylate. The monofunctional hydrophobic monomer is not particularly limited so long as it is a monofunctional hydrophobic monomer, but a mixture of phenoxyethyl acrylate and isobornyl acrylate, for example, may be used.

The monofunctional hydrophobic monomer may be comprised in an amount greater than 0 and equal to or less than 50 parts by weight based on 100 parts by weight of a total adhesive composition, and for example, when PEA and IBOA are comprised, PEA may be comprised in an amount greater than 0 and equal to or less than 30 parts by weight, and IBOA may be comprised in an amount greater than 0 and equal to or less than 20 parts by weight based on 100 parts by weight of the total adhesive composition, respectively. When PEA is added, adhesion with respect to the hydrophobic substrate is improved, and when PEA is comprised in an amount greater than 30 parts by weight, the adhesive strength of the polarizing plate may be limited because adhesive strength with respect to polyvinyl alcohol (PVA) decreases. When IBOA is added, adhesion with respect to the hydrophobic substrate is improved, and when IBOA is comprised in an amount greater than 20 parts by weight, adhesive strength may significantly decrease. When PEA and IBOA are comprised within the foregoing range of parts by weight, the adhesive strength of the adhesive composition according to the present invention may be improved.

The present invention relates to a photocurable-type adhesive composition and the thickness of a final adhesive layer will be very thick in comparison to the case of a water-based adhesive because a solid content is 100% when a solvent is not added with respect to the foregoing photocurable-type adhesive. Therefore, the thickness of the adhesive layer may be decreased by minimizing viscosity, and the adhesive composition for a polarizing plate may have a viscosity range of 10 cP to 30 cP at 25° C., and for example, may have a viscosity of 20 cP or so.

The adhesive composition according to the present invention has low viscosity and comprises an acrylic monomer having a hydrophilic group as a major component. Adhesive strength and water resistivity may be improved by adding an epoxy resin and a cationic photopolymerization initiator. In particular, thermal shock physical properties may be improved when the combination of the first epoxy compound including one or more epoxidized aliphatic cyclic groups and the second epoxy compound including one or more glycidyl ether groups is used as described in the present invention.

The cationic polymerization initiator generates cations or a Lewis acid according to the irradiation of active energy rays such as visible light, ultra violet rays, X-rays, and electron beams or heating, and initiates a polymerization reaction of an epoxy group. Therefore, the epoxy resin of the present invention may be denoted as a hybrid curable-type resin according to the cations and the radical initiator.

Meanwhile, the radical initiator is one used in the art and is not particularly limited. For example, a radical initiator such as a phenylketone-based, an acetophenone-based, a benzoinether-based, a benzophenone-based, a thioxanthone-based, an acylphosphine oxide-based, an oxime ester-based, and camphorquinone-based may be used.

The adhesive composition for a polarizing plate may further comprise a photosensitizer, an antioxidant, an oligomer, and an adhesion promoter as needed, and may further comprise greater than 0 and equal to or less than 4 parts by weight of urethane acrylate. Viscosity tends to increase when a urethane acrylate is added, but the increased viscosity of the adhesive may be lowered by increasing temperature.

The adhesive composition for a polarizing plate according to the present invention, in which urethane acrylate is added, may provide appropriate adhesive strength when being used with respect to an acrylic film.

In general, a UV screening agent is included in a polarizer protective film for protecting a polarizer, and since ultra violet rays having a wavelength of 365 nm or less are mostly absorbed by the UV screening agent when the UV screening agent is included, a long-wavelength initiator absorbing light in a wavelength of 365 nm or more may be used as the photopolymerization initiator. Particular examples of the long-wavelength initiator may be α-hydroxyketone, phenylglyoxylate, benzyldimethylketal, α-aminoketone, monoacylphosphine, bisacylphosphine, and combinations thereof. However, the long-wavelength initiator is not limited thereto.

A thickness of the adhesive layer formed by the adhesive composition may be greater than 0 and equal to or less than 10 μm, but the thickness of the adhesive layer is not limited thereto. When the thickness is more than 10 μm, an increase in the unit price of the adhesive and changes in durability characteristics and appearance with respect to the physical properties of the adhesive layer may be generated.

FIG. 1 exemplarily illustrates a polarizer 1 and a transparent protective film or a viewing angle protective film 2a, which are bonded by an adhesive layer 3 formed by an adhesive composition according to the present invention.

The adhesive composition of the present invention provides hydrophilicity by means of an acrylic monomer having a hydrophilic group as well as decreases a content of a highly viscous oligomer for low viscosity, and only a small amount of an epoxy resin and a photopolymerization initiator is included to increase the degree of curing and improve water resistivity and thermal shock physical properties.

According to the present invention, there is provided a polarizing plate comprising: a polarizer; a polymer film adhered to one side or both sides of the polarizer; and an adhesive layer for bonding the polarizer and the polymer film, wherein the adhesive layer is formed of an adhesive composition comprising one or more acrylic monomers having a hydrophilic group, a radical polymerization initiator, an epoxy resin, and a cationic photopolymerization initiator. The adhesive composition, which may be used in the preparation of the polarizing plate of the present invention, is as described above.

The polymer film, which may be used for the preparation of the polarizing plate of the present invention, may be at least one selected from the group consisting of an acrylic film, a polyethylene terephthalate (PET) film, a PET film treated with an acrylic primer, a polynorbornene (PNB)-based film, a cycloolefin (COP) film, a polycarbonate film, and a TAC film including NRT (60 μm, Fujifilm), N TAC (40 μm, Konica), V TAC (80 μm, Fujifilm), or UZ TAC (60 μm, Fujifilm). However, the polymer film is not limited thereto and a polymer film known in the art may be used. Meanwhile, if necessary, a corona treatment or the like may be further performed during bonding with the polymer film.

The acrylic film may be a film comprising a copolymer including an alkyl(meth)acrylate-based unit and a styrene-based unit, and an aromatic resin having a carbonate portion in the main chain, or a film comprising an alkyl(meth)acrylate unit, a styrene-based unit, a 3- to 6-membered heterocyclic unit substituted with at least one carbonyl group, and a vinyl cyanide unit, or a film comprising an aromatic unit having a chain with a hydroxy group-containing portion and an aromatic portion and a styrene-based unit including one or more styrene-based derivatives. The film comprising the aromatic unit having a chain with a hydroxy group-containing portion and an aromatic portion and the styrene-based unit including one or more styrene-based derivatives may be a film having an absolute value of an in-plane retardation value (Rin) and a thickness retardation value (Rth) of 10 nm or less regardless of the presence of stretching.

In the polarizing plate according to the present invention, a film formed of polyvinyl alcohol (PVA) including iodine or a dichroic dye may be used as the polarizer. The polarizer may be prepared by dyeing a PVA film with iodine or a dichroic dye, but the preparation method thereof is not particularly limited. In the present specification, the polarizer denotes a state not including a protective film and the polarizing plate denotes a state including a protective film.

The polarizing plate according to the present invention may be prepared through a method known in the art by using the foregoing polarizer, polarizer protective film or viewing angle compensation film as a polymer film, and an adhesive composition according to the present invention. For example, the polarizing plate according to the present invention may be prepared by coating the adhesive composition of the present invention on at least one side of the polarizer or the polarizer protective film or the compensation film, and then passing the polarizer and the polarizer protective film or the compensation film through a laminator. However, the method of preparing the polarizing plate is not limited thereto.

Figure 2:
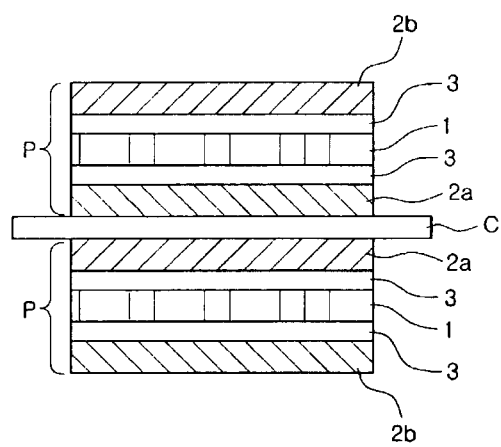
FIG. 2 illustrates a liquid crystal cell C, in which polarizing plates P comprising the adhesive composition of the present invention are disposed on both sides thereof.

Also, the present invention provides an optical device comprising the foregoing polarizing plate. For example, the optical device of the present invention may be a liquid crystal display device as shown in FIG. 2 and is a liquid crystal display device comprising a liquid cell and the first and second polarizing plates respectively included on both sides of the liquid cell, in which at least one of the first and second polarizing plates may be the polarizing plate according to the present invention.

Hereinafter, the present invention will be described in more detail according to examples. However, the following examples are merely provided to exemplify the present invention, not to limit the scope of the present invention.

MODES FOR CARRYING OUT THE INVENTION

Example

Preparation Example 1

Preparation of Polarizer Protective Film (1) Acrylic Polymer Film

A resin composition, in which a poly(N-cyclohexylmaleimide-co-methylmethacrylate) resin, a styrene-maleic anhydride copolymer resin, and a phenoxy-based resin were uniformly mixed in a weight ratio of 100:2.5:5, was supplied to an 24φ extruder, which was filled with nitrogen from a raw material hopper to the extruder, and was then melted at 250° C. to prepare raw material pellets.

The phenoxy-based resin used was InChemRez® PKFE (Mw=60,000, Mn=16,000, Tg=95° C.), the styrene-maleic anhydride copolymer resin used was Dylaeck 332 containing 85 wt % of styrene and 15 wt % of maleic anhydride, and the poly(N-cyclohexylmaleimide-co-methylmethacrylate) resin had a N-cyclohexylmaleimide content of 6.5 wt % according to the result of nuclear magnetic resonance (NMR) analysis.

The raw material pellets thus obtained was vacuum dried and melted in the extruder at 260° C., and then passed through a coat hanger type T-die. Thereafter, a 150 μm thick film was prepared by passing through a chromium-coated casting roll and a drying roll. The film was stretched using the velocity difference of rolls at a ratio described in the following Table 1 in a machine direction (MD) at 125° C. by using a pilot stretching machine, and then a film was prepared by stretching at a ratio described in the following Table 1 in a transverse direction (TD) at 125° C. by using a tenter. In-plane and thickness retardation values of the foregoing film are presented in the following Table 1.

TABLE 1

| MD stretch ratio | TD stretch ratio | Retardation value (nm) | | Thickness (μm) |
|---|---|---|---|---|
| | | Rin | Rth | |
| 100% | 100% | 0.4 | +0.6 | 160 |
| 150% | 100% | 0.2 | +1.0 | 118 |
| 150% | 200% | 1.0 | −1.6 | 59 |
| 150% | 250% | 0.9 | −1.1 | 47 |
| 160% | 100% | 0.4 | +0.1 | 116 |
| 160% | 200% | 0.9 | −1.5 | 56 |
| 160% | 250% | 0.8 | −1.3 | 46 |
| 170% | 100% | 1.0 | +1.9 | 114 |
| 170% | 200% | 0.7 | −1.9 | 55 |
| 170% | 220% | 0.5 | −1.5 | 50 |
| 170% | 250% | 0.5 | −1.4 | 42 |

(2) TAC-Based Polymer Film

Commercial V TAC (Fujifilm), N TAC (Konica), and UZ TAC (Fujifilm) were used as a TAC-based polymer film.

Example 1

(1) Preparation of Adhesive

An adhesive composition for a polarizing plate was prepared by mixing 38.5 wt % of 2-hydroxyethyl acrylate (2-HEA), wt % of phenoxyethyl acrylate (PEA), and 15 wt % of isobornyl acrylate (IBOA) as a monomer, 3 wt % of CGI 819 as a radical initiator, 3 wt % of an iodine initiator (Ciba-Geiger AG, Irgacure 250) as a cationic photopolymerization initiator, 0.5 wt % of a photosensitizer (Aldrich, isopropyl thioxanthone), and wt % of celloxide 2021P and 15 wt % of 1,4-cyclohexane dimethanol diglycidyl ether (CHDMGDE) (HAJIN CHEM TECH Co., Ltd.) as an epoxy resin.

(2) Preparation of Polarizing Plate

Front and back sides of a PVA device, in which the both sides were covered with V TAC (or N TAC or an acryl film of Preparation Example 1(1)) (substrate 1) and TAC (UZ TAC) (substrate 2), was coated with the adhesive prepared in Example 1(1) by a spoid, and then the PVA device was passed through a laminator (5 m/min). Conditions were set to obtain a final adhesive layer having a thickness range of 1 μm to 2 μm, and then the laminated polarizing plate put on a belt was irradiated with ultra violet rays having an intensity of 2000 mJ/cm$^2$ by using a UV metal halide lamp.

Example 2

A polarizing plate was prepared in the same manner as Example 1 except that an adhesive comprising 20 wt % of celloxide 2021P and 10 wt % of 1,4-CHDMGDE (HAJIN CHEM TECH Co., Ltd.) as an epoxy resin was used.

Example 3

A polarizing plate was prepared in the same manner as Example 1 except that an adhesive comprising 28.5 wt % of 2-HEA as a monomer and 20 wt % of celloxide 2021P and 20 wt % of 1,4-CHDMGDE (HAJIN CHEM TECH Co., Ltd.) as an epoxy resin was used.

Example 4

A polarizing plate was prepared in the same manner as Example 1 except that an adhesive comprising 29 wt % of 2-HEA as a monomer, 20 wt % of celloxide 2021P and 20 wt % of 1,4-CHDMGDE (HAJIN CHEM TECH Co., Ltd.) as an epoxy resin, 3 wt % of sulphonium salt initiator, and not comprising an iodine initiator and a photosensitizer was used.

Example 5

A polarizing plate was prepared in the same manner as Example 1 except that an adhesive comprising 28.5 wt % of 2-HEA as a monomer, 10 wt % of celloxide 2021P and 15 wt % of 1,4-CHDMGDE (HAJIN CHEM TECH Co., Ltd.) as an epoxy resin, and 15 wt % of bisphenol-F type (Sigma-Aldrich Co., LLC) epoxy was used.

Comparative Example 1

A polarizing plate was prepared in the same manner as Example 1 except that an adhesive not comprising celloxide 2021P and 1,4-CHDMGDE (HAJIN CHEM TECH Co., Ltd.) as an epoxy resin, but comprising 68.5 wt % of 2-HEA was used.

Comparative Example 2

A polarizing plate was prepared in the same manner as Example 1 except that an adhesive comprising 30 wt % of celloxide 2021P and not comprising 1,4-CHDMGDE (HAJIN CHEM TECH Co., Ltd.) as an epoxy resin was used.

Comparative Example 3

A polarizing plate was prepared in the same manner as Example 1 except that an adhesive not comprising celloxide 2021P but comprising 30 wt % of 1,4-CHDMGDE (HAJIN CHEM TECH Co., Ltd.) as an epoxy resin was used.

Comparative Example 4

A polarizing plate was prepared in the same manner as Example 1 except that an adhesive comprising 40 wt % of celloxide 2021P and 5 wt % of 1,4-CHDMGDE (HAJIN CHEM TECH Co., Ltd.) as an epoxy resin was used.

Comparative Example 5

A polarizing plate was prepared in the same manner as Example 1 except that an adhesive comprising 5 wt % of celloxide 2021P and 40 wt % of 1,4-CHDMGDE (HAJIN CHEM TECH Co., Ltd.) as an epoxy resin was used.

Experimental Example 1

Polarizing Plate Peeling Force Evaluation

Peeling force between a polarizer and a polarizing plate protective film was measured with respect to the polarizing plates prepared in the foregoing Examples and Comparative Examples. In a peeling experiment, peeling force was measured at a rate of 300 m/min and in 90 degrees by using a polarizing plate having a width of 20 mm and a length of 100 mm. The results thereof are presented in Table 2 (more than 2 N/cm: OK, 2 N/cm or less: NG).

Experimental Example 2

Viscosity Measurement

Viscosities of the adhesives prepared in the foregoing Examples and Comparative Examples were measured at 25° C. and a TV-22 viscometer (TOK SANGYO) was used for viscosity measurements. The results thereof are presented in the following Table 2.

Experimental Example 3

Measurement of Glass Transition Temperature (Tg)

Glass transition temperatures (Tg) of adhesive layers were measured by using a differential scanning calorimeter (DSC, Mettler-Toledo International Inc.). The adhesive layers of the polarizing plates prepared under the foregoing curing conditions were separated, and then the glass transition temperatures in the second run were measured by increasing temperatures from −50° C. to 150° C. The results thereof are presented in the following Table 2.

Experimental Example 4

Thermal Shock Physical Properties Evaluation

Durability evaluations (from −40° C. to 80° C., 100 cycles) of glass-laminated polarizing plates were performed, and then the appearances of the polarizing plates were evaluated (no deformation: OK, generation of PVA cracks: NG). The results thereof are presented in the following Table 2.

CHDMGDE: HAJIN CHEM TECH Co., Ltd.
Bisphenol-F type: Sigma-Aldrich Co., LLC
Celloxide 2021P: Daicel Corporation
G-Corona: The acryl film prepared in Preparation Example 1(1)

REFERENCE NUMERALS

1: a polarizer
2a: a protective film or a compensation film
2b: a protective film
3: an adhesive layer
P: a polarizing plate
C: a liquid crystal cell

The invention claimed is:

1. An adhesive composition for a polarizing plate comprising:
    one or more acrylic monomers having a hydrophilic group;
    a radical polymerization initiator;
    an epoxy resin; and
    a cationic photopolymerization initiator, and
    wherein the epoxy resin is comprised of a combination of a first epoxy resin compound including one or more epoxidized aliphatic cyclic groups and a second epoxy compound including one or more glycidyl ether groups, and
    wherein the first and second epoxy compounds are comprised in a weight ratio range of 1:3 to 3:1, and
    wherein the adhesive composition comprises from 15 to 40 parts by weight of the first epoxy compound and from 15 to 40 parts by weight of the second epoxy compound based on 100 parts by weight of the adhesive composition.

2. The adhesive composition for a polarizing plate of claim 1, wherein the adhesive composition for a polarizing plate comprises from 20 to 80 parts by weight of the one or more acrylic monomers having a hydrophilic group, from 0.5 to 10 parts by weight of the radical polymerization initiator, from 30 to 80 parts by weight of the epoxy resin and from 1 to 10 parts by weight of the cationic photopolymerization initiator.

3. The adhesive composition for a polarizing plate of claim 1, wherein the adhesive composition for a polarizing plate comprises from 20 to 50 parts by weight of the one or more acrylic monomers having a hydrophilic group, from 0.5 to 5 parts by weight of the radical polymerization initiator, from 20 to 60 parts by weight of the epoxy resin and from 1 to 7 parts by weight of the cationic photopolymerization initiator.

TABLE 2

|  | Tg | Viscosity (cP) | Thermal Shock Evaluation | V TAC Corona | N TAC Corona | UZ TAC Corona | G-Corona |
|---|---|---|---|---|---|---|---|
| Example 1 | 40 | 16 | OK | OK | OK | OK | NG |
| Example 2 | 42 | 17 | OK | OK | OK | OK | NG |
| Example 3 | 45 | 21 | OK | OK | OK | OK | NG |
| Example 4 | 40 | 20 | OK | OK | OK | OK | OK |
| Example 5 | 47 | 23 | OK | NG | OK | OK | OK |
| Comparative Example 1 | 18 | 10 | NG | OK | OK | OK | NG |
| Comparative Example 2 | 56 | 16 | OK | NG | NG | OK | NG |
| Comparative Example 3 | 20 | 12 | NG | OK | OK | OK | NG |
| Comparative Example 4 | 65 | 24 | OK | NG | NG | NG | NG |
| Comparative Example 5 | 21 | 17 | NG | OK | OK | OK | NG |

4. The adhesive composition for a polarizing plate of claim 1, wherein the adhesive composition for a polarizing plate comprises 30 parts by weight of the one or more acrylic monomers having a hydrophilic group, 3 parts by weight of the radical polymerization initiator, 40 parts by weight of the epoxy resin and 3 parts by weight of the cationic photopolymerization initiator.

5. The adhesive composition for a polarizing plate of claim 1, wherein the hydrophilic group is a hydroxy group (—OH).

6. The adhesive composition for a polarizing plate of claim 1, wherein the first epoxy compound is selected from the group consisting of 3,4-epoxycyclohexylmethyl-3,4-epoxycyclohexane carboxylate, bis(3,4-epoxycyclohexylmethyl) adipate dicyclopentadiene dioxide, limonene dioxide, and 4-vinylcyclohexene dioxide.

7. The adhesive composition for a polarizing plate of claim 1, wherein the second epoxy compound is selected from the group consisting of 1,4-cyclohexanedimethanol diglycidyl ether, a novolac-based epoxy, a bisphenol A-based epoxy, a bisphenol F-based epoxy, a brominated bisphenol-based epoxy, 1,6-hexanediol diglycidyl ether, trimethylolpropane triglycidyl ether, n-butyl glycidyl ether, aliphatic glycidyl ether(C12-C14), 2-ethylhexyl glycidyl ether, phenyl glycidyl ether, o-cresyl glycidyl ether, and nonyl phenyl glycidyl ether.

8. The adhesive composition for a polarizing plate of claim 1, wherein the acrylic monomer having a hydrophilic group is selected from the group consisting of hydroxyethyl acrylate (HEA), hydroxyethyl methacrylate, hydroxypropyl acrylate, hydroxypropyl methacrylate, hydroxybutyl acrylate, or a mixture thereof.

9. The adhesive composition for a polarizing plate of claim 1, wherein the adhesive composition for a polarizing plate further comprises greater than 0 and equal to or less than 50 parts by weight of a monofunctional hydrophobic monomer based on 100 parts by weight of a total adhesive composition.

10. The adhesive composition for a polarizing plate of claim 9, wherein the monofunctional hydrophobic monomer comprises at least one monomer selected from the group consisting of isobornyl acrylate (IBOA), benzyl(meth)acrylate, nonyl(meth)acrylate, isobutyl(meth)acrylate, isodecyl acrylate, lauryl acrylate, stearyl acrylate, 2-ethyl hexyl acrylate, polyethylene glycol methacrylate, octyl/decyl acrylate, phenoxyethyl acrylate (PEA), nonylphenol ethoxylate acrylate, dicyclopentenyl acrylate, dicyclopentenyl oxyethyl acrylate, propylene glycol mono(meth)acrylate, and ethoxyethoxy ethyl acrylate.

11. The adhesive composition for a polarizing plate of claim 9, wherein the monofunctional hydrophobic monomer is phenoxyethyl acrylate and isobornyl acrylate.

12. The adhesive composition for a polarizing plate of claim 11, wherein the adhesive composition for a polarizing plate comprises from 20 to 80 parts by weight of hydroxyethyl acrylate, greater than 0 and equal to or less than 30 parts by weight of phenoxyethyl acrylate, greater than 0 and equal to or less than 20 parts by weight of isobornyl acrylate, from 30 to 80 parts by weight of an epoxy resin, from 1 to 7 parts by weight of a cationic photopolymerization initiator, from and 0.5 to 5 parts by weight of a radical polymerization initiator.

13. The adhesive composition for a polarizing plate of claim 1, wherein the adhesive composition for a polarizing plate has a viscosity range of from 10 cP to 30 cP at 25° C.

14. The adhesive composition for a polarizing plate of claim 1, wherein the adhesive composition for a polarizing plate further comprises greater than 0 and equal to or less than 4 parts by weight of urethane acrylate.

* * * * *